United States Patent [19]

Oswald et al.

[11] Patent Number: 4,595,069
[45] Date of Patent: Jun. 17, 1986

[54] ALL TERRAIN/HIGH SPEED UNDERCARRIAGE

[75] Inventors: Norman D. Oswald, Duncanville; Carl M. Franklin, Midlothian; Marc H. Gutzler, Duncanville; Harry S. Mankey, Dallas, all of Tex.

[73] Assignee: Standard Manufacturing Company, Inc., Dallas, Tex.

[21] Appl. No.: 506,403

[22] Filed: Jun. 21, 1983

Related U.S. Application Data

[63] Continuation-in-part of Ser. No. 426,218, Sep. 28, 1982, Pat. No. 4,454,925.

[51] Int. Cl.$^4$ .............................................. B62D 61/10
[52] U.S. Cl. ................................. 180/24.02; 280/6 H
[58] Field of Search ................. 180/22, 24.02, 6.54, 180/9.1, 148; 280/6 H, 705; 267/179

[56] References Cited

U.S. PATENT DOCUMENTS

| | | | |
|---|---|---|---|
| 1,836,446 | 12/1931 | Christie | 180/9.1 |
| 2,044,306 | 6/1936 | Kegresse | 180/6.54 |
| 2,890,064 | 6/1959 | Hudson | 180/148 |
| 3,299,978 | 1/1967 | Sponsler | 180/24.02 |
| 3,930,550 | 1/1976 | Rose et al. | 280/705 |
| 4,310,173 | 1/1982 | Varady | 280/6 H |
| 4,315,631 | 2/1982 | Rainville | 280/6 H |
| 4,325,443 | 4/1982 | Fischer et al. | 180/22 |

FOREIGN PATENT DOCUMENTS

| | | | |
|---|---|---|---|
| 336633 | 4/1959 | Switzerland | 267/179 |
| 169000 | 11/1965 | U.S.S.R. | 280/6 H |

Primary Examiner—John A. Pekar
Assistant Examiner—Ross Weaver
Attorney, Agent, or Firm—Michael A. O'Neil

[57] ABSTRACT

An undercarriage (12) includes a primary frame (22) and a plurality of secondary frames (26) which in turn carry wheel members (28). The secondary frames (26) are urged to pivot away from the primary frame (12) by spring mechanisms (38). The center secondary frames (26c) are each biased outwardly by two spring mechanisms (38) while the endmost secondary frames (26e) are biased outwardly by a single spring mechanism (38). An undercarriage (112) includes a primary frame (122) and a plurality of secondary frames (126) which in turn carry wheel members (128). Pivotal movement of the endmost secondary frames (126e) is controlled by spring/shock absorber assemblies (134). Pivotal movement of the center secondary frame (126c) is controlled by a spring/shock absorber/cylinder assembly (136) which selectively positions the center wheel member (128) below the end wheel member to facilitate skid steering, or in alignment with the end wheel members to facilitate high speed operation.

20 Claims, 11 Drawing Figures

ALL TERRAIN/HIGH SPEED UNDERCARRIAGE

CROSS-REFERENCE TO RELATED APPLICATIONS

This is a continuation-in-part of application Ser. No. 426,218, filed Sept. 28, 1982 now U.S. Pat. No. 4,454,925.

TECHNICAL FIELD

This invention relates to vehicular undercarriages, and more particularly to an undercarriage adapted both for off road rough terrain usage and for on road high speed usage.

BACKGROUND ART

Heretofore, military equipment such as tanks, armored personnel carriers and the like have generally comprised track vehicles. The advantages that are derived from the use of track vehicles in areas of highy adverse terrain are well known. It is also generally known that, at least for long term operation, track vehicles are limited to slow speeds such as 3 or 4 m.p.h. Thus, although some tanks can be driven as fast as 40 m.p.h., such operation requires the replacement of the tracks after as little as one or two days of high speed use.

The use of track vehicles came into vogue during World Wars I and II which were fought over vast areas and under such differing adverse terrains as beaches, farmlands, trenches, mountains, etc. Modern warfare often poses quite different problems. For example, terrorist activities or insurrections may require the deployment of military equipment over a substantial distance at very high speeds. Such deployment must be carried out under conditions of substantial comfort if the personnel involved are to arrive at the scene of conflict in a relatively fresh condition. Once at the scene the deploying vehicle must be capable of operating over highly adverse terrain including such obstacles as barricades, rubble from burned or bombed out buildings, bomb craters and the like.

Thus, a need exists for military equipment which is adapted for long term operation at relatively high speeds and under conditions of maximum comfort, while at the same time being capable of successfully negotiating various types of extremely adverse terrain. From the standpoint of practicality such equipment should resemble prior designs as closely as possible and in fact should incorporate parts common to currently utilized equipment insofar as is possible.

The present invention fulfills the foregoing and other objectives to provide an entirely unique undercarriage adapted for use with various types of military and civilian equipment. In accordance with the broader aspects of the invention, a superstructure, which may be identical to that of prior equipment designs, is supported on and transported over the underlying surface by a pair of undercarriages each incorporating the present invention. Each of the undercarriages comprises an elongate hollow primary load bearing frame. A plurality of primary axles are rotatably supported at longitudinally spaced points along the primary frame. A primary transmission mechanism extends through the primary frame for drivingly interconnecting the primary axles, and a drive mechanism is mounted on the frame for cooperation with the primary transmission mechanism to rotate the primary axles.

A plurality of secondary frames are pivotally supported on the primary frame, and a secondary axle is rotatably supported on each secondary frame. A secondary transmission mechanism extends through each secondary frame to provide a driving connection between one of the primary axles and the secondary axle carried by the secondary frame. Each secondary axle supports and drives a wheel member comprising an elastomeric tire. The secondary frames extend angularly downwardly and rearwardly from the primary frame and substantially parallel to each other. Spring mechanisms urge the secondary frames to pivot away from the primary frame.

In a first embodiment of the invention, pivotal movement of the endmost secondary frames is under the action of one spring mechanism, while the pivotal movement of each center secondary frame is under the action of two spring mechanisms. By this means the wheel members of the center secondary frames engage the underlying surface under substantially greater force than the endmost wheel members, thereby facilitating skid steering of the armored personnel carrier. In a second embodiment of the invention, pivotal movement of each secondary frame is controlled by a spring/shock absorber assembly. The spring/shock absorber assemblies of the center wheels include hydraulic cylinders for normally positioning the center wheels below the endmost wheels to facilitate skid steering, and for selectively raising the center wheels for high speed operation.

In accordance with more specific aspects of the invention, each secondary frame is hollow and contains the secondary transmission means individual thereto. Each secondary transmission means comprises a sprocket mounted on the associated primary axle, a sprocket mounted on the secondary axle rotatably supported in the secondary frame and a drive chain drivingly interconnecting the two sprockets. Each secondary frame includes a disc brake for selective actuation to arrest rotation of the secondary axle rotatably supported therein and the wheel member carried by the secondary axle.

BRIEF DESCRIPTION OF THE DRAWINGS

A more complete understanding of the invention may be had by reference to the following Detailed Description when taken in conjunction with the accompanying Drawings, wherein.

DETAILED DESCRIPTION

Figure 1:
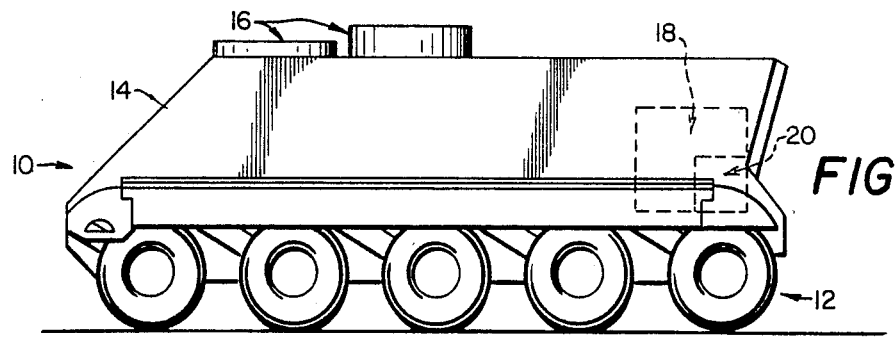
FIG. 1 is a side view of an armored personnel carrier incorporating the undercarriage constructed in accordance with a first embodiment of the invention.

Referring now to the Drawings, and particularly to FIG. 1 thereof, there is shown an armored personnel carrier 10 incorporating undercarriages 12 comprising a first embodiment of the present invention. The armored personnel carrier 10 includes a hull 14 having one or more hatches 16. The armored personnel carrier 10 may further include various weapons, detection apparatus such as radar, and other accessories and features as required. The hull 14 encloses a prime mover 18 which may comprise an ignition/combustion engine, a diesel engine, a gas turbine, etc. In accordance with the particular application of the invention illustrated in the drawings, the prime mover 18 drives a hydrostatic pump 20 which supplies pressurized hydraulic fluid for operating the undercarriages 12 of the present invention. However, other drive systems may be utilized in the practice of the invention, if desired.

The hull 14 and the prime mover 18 of the armored personnel carrier 10 do not comprise part of the invention. In fact, one of the important features of the invention involves the fact that the undercarriages 12 may be utilized to support and drive an armored personnel carrier comprising a hull 14 and a prime mover 18 of conventional design. That is, the undercarriage 12 of the present invention may be utilized in conjunction with a conventional armored personnel carrier hull 14 having a conventional prime mover 18 in lieu of the tracks which are conventionally used in conjunction therewith.

Figure 2:
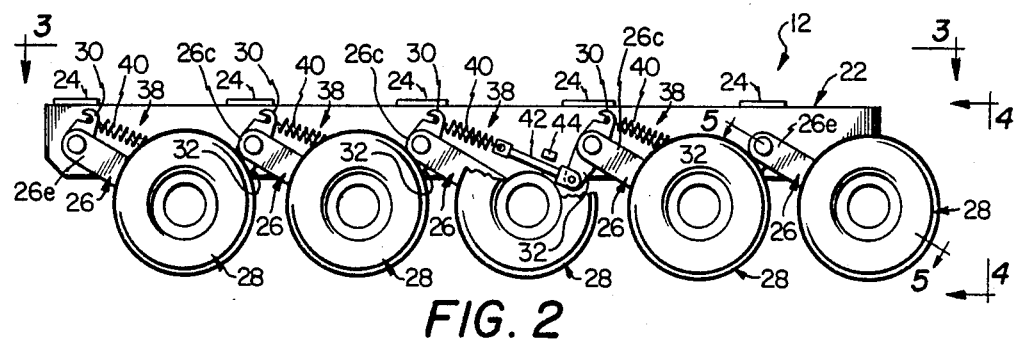
FIG. 2 is a side view of the undercarriage of the armored personnel carrier of FIG. 1 in which certain parts have been broken away more clearly to illustrate certain features of the invention.

Referring now to FIG. 2, each undercarriage 12 of the armored personnel carrier 10 comprises an elongate hollow load bearing primary frame 22. The primary frame 22 is of uniform cross sectional configuration throughout its length. This is an important feature of the invention in that it permits the primary frame 22 to be connected to the hull 14 of the armored personnel carrier 10 at any point along its entire length and at any point around its entire periphery without necessitating either redesign of the attachment apparatus of the hull 14 or providing special portions of the primary frame 22 to permit attachment of the hull thereto. A plurality of access ports 24 are provided along the top surface of the primary frame 22 to facilitate assembly of the undercarriage 12 and also to permit periodic maintenance.

A plurality of secondary frames 26 are supported on the primary frame 22 for pivotal movement with respect thereto. Each of the secondary frames 26 in turn supports a wheel member 28 at the distal end thereof. The wheel members 28 preferably comprise elastomeric tires, although other types of wheels and/or tires may be utilized in the practice of the invention, if desired.

In accordance with the embodiment of the invention illustrated in FIGS. 1-5, each undercarriage 12 comprises five secondary frames 26 and five wheel members 28 carried thereby. It will be understood that the precise number of secondary frames and wheel members which are utilized in a particular undercarriage is not critical to the practice of the invention. In those instances in which five secondary frames 26 are utilized, there is provided two endmost secondary frames 26e and three center secondary frames 26c.

The forward secondary frame 26e comprises a single lever arm 30 facing rearwardly toward the adjacent center secondary frame 26c. Each of the center secondary frames 26c includes a dual lever arm comprising a lever arm 30 facing the next rearwardly positioned secondary frame and a lever arm 32 facing the next forwardly positioned secondary frame. The rear secondary frames 26e comprises a single lever arm facing the next adjacent center secondary frame 26c, and each of the center secondary frames 26c comprises two lever arms each facing one of the adjacent two secondary frames.

The undercarriage 12 further includes a plurality of spring mechanisms 38 which interconnect the lever arms 30 and 32 of the secondary frames 26. Thus, one of the spring mechanisms 38 interconnects the lever arm 30 of the forward secondary frame 26e and the lever arm 32 of the next adjacent center secondary frame 26c. In turn, a spring mechanism 38 interconnects the lever arm 30 of the forward secondary frame 26c and the lever arm 32 of the middle secondary frame 26c. Likewise, a spring mechanism 38 interconnects the lever arm 30 of the middle secondary frame 26c and the lever arm 32 of the rearward secondary frame 26c. Finally, a spring mechanism 38 interconnects the lever arm 30 of the rearward secondary frame 26c and the lever arm 32 of the secondary frame 26e situated at the rear of the undercarriage 12.

Each of the spring mechanisms 38 comprises a tension spring 40 and an adjusting mechanism 42 for varying the tension of the spring 40. The adjusting mechanism 42 may comprise any of the various well known types, for example, the adjusting mechanism 42 may comprise a screw which is received in a nut to adjust the distance between the points of attachment of the tension spring 40 and thereby control the tension of the spring. A stop member 44 is provided for limiting pivotal movement of each secondary frame 26.

As is the case in conventional armored personnel carriers incorporating track-type undercarriages, the armored personnel carrier of FIG. 1 utilizing the undercarriages 12 of the present invention is skid steered. It has been determined that the effort required to effect steering of a skid steered vehicle can be substantially reduced when the wheel base of the vehicle is minimized. Conversely, in many all terrain vehicles it is desirable to increase the wheel base length for such purposes as increasing stability, increasing traction and providing a more comfortable ride.

These seemingly divergent requirements are accomplished in the undercarriage of the present invention by means of the pivotally supported secondary frames 26 which are interconnected by the spring mechanisms 38. Having reference particularly to FIGS. 2 and 3, it will be understood that the spring mechanisms 38 urge all of the secondary frames 26 and the wheel members 28 carried thereby to pivot away from the primary frame 22. However, whereas each of the endmost secondary frames 26e is urged to pivot away from the primary frame 22 by a single spring mechanism 38, each of the center secondary frames 26c is urged to pivot away from the primary frame 22 by two spring mechanisms 38. Thus, the pivoting spring force which is applied to the center secondary frames 26c is substantially double that which is applied to the endmost secondary frames 26e.

The foregoing arrangement allows the use of five wheel members 28 on each of the undercarriages 12 of the armored personnel carrier 10. This is highly desirable in that it increases stability, particularly in those cases in which the loading of the armored personnel carrier may be uneven, in that it substantially increases traction by increasing the number of wheels which are engaged with the underlying surface, and in that it increases comfort for persons riding in the armored personnel carrier by smoothing the movement thereof over obstacles, trenches and the like. Moreover, because of the arrangement of the spring mechanisms 38, the wheel members 28 carried by the three center secondary frames 26c support approximately 80% of the load which is carried by the undercarriage 12, while the wheel members 28 carried by the two endmost secondary frames 26e carry approximately 20% of the load. Because of the substantially increased loading of the three center wheel members 28, the effective wheel base of the armored personnel carrier is substantially reduced insofar as skid steering is concerned. Thus, the particular arrangement of secondary frames and spring mechanisms which is utilized in the embodiment of the invention illustrated in FIGS. 1-5 provides the dual advantages of a long wheel base vehicle insofar as stability, traction and passenger comfort are concerned while providing the advantages of a short wheel base vehicle with respect to the effort required to effect skid steering.

Figure 3:
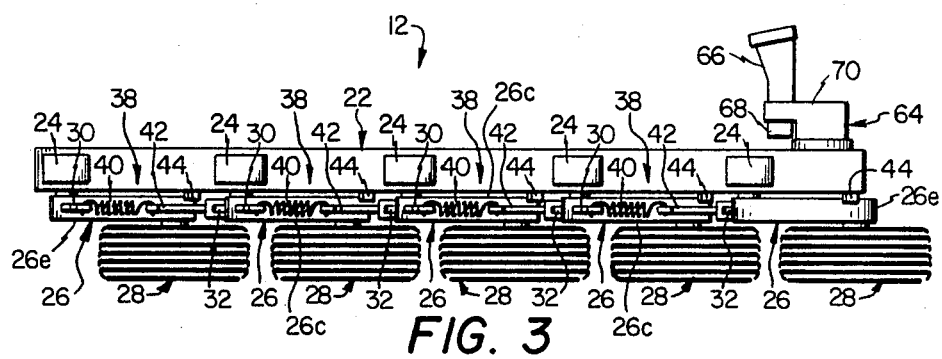
FIG. 3 is a top view of the undercarriage of FIG. 2 taken along the line 3—3 in FIG. 2 in the direction of the arrows.
Figure 4:
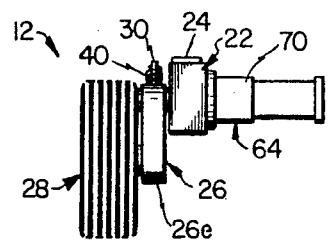
FIG. 4 is an end view of the undercarriage of FIG. 2 taken along the line 4—4 in FIG. 2 in the direction of the arrows.
Figure 5:
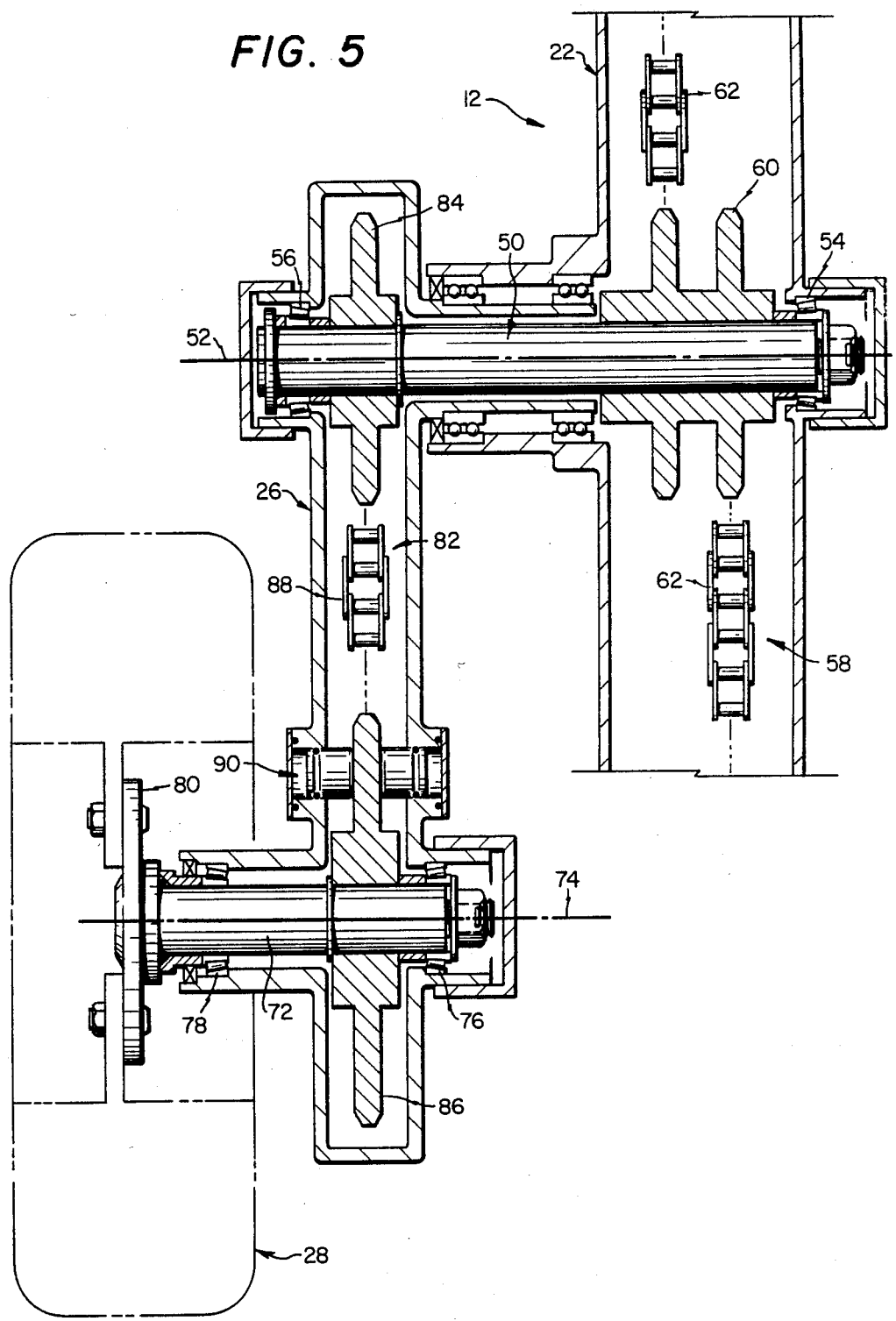
FIG. 5 is a sectional view taken along the line 5—5 in FIG. 2 in the direction of the arrows.

Referring now to FIGS. 3, 4 and 5, the undercarriage 12 of the present invention is shown in greater detail. A plurality of primary axles 50 are positioned at longitudinally spaced points along the primary frame 22. Each primary axle 50 is supported for rotation about an axis 52 by a tapered roller bearing 54 mounted in the primary frame 22 and a tapered roller bearing 56 mounted in the secondary frame 26 individual to the particular axle 50. A primary transmission 58 extends through the primary frame 22 and drivingly interconnects the primary axles 50. The primary transmission 58 comprises a plurality of drive sprockets 60 each mounted on one of the primary axles 50. The drive sprockets 60 are drivingly interconnected by a plurality of drive chains 62.

As is best shown in FIGS. 3 and 4, the undercarriage 12 further comprises a drive mechanism 64. The drive mechanism 64 is mounted on the primary frame 22 and is operatively connected to the primary transmission 58 for cooperation therewith to effect rotation of all of the primary axles 50. The drive mechanism 64 includes a hydrostatic motor 66 which is driven by pressurized hydraulic fluid received from the hydrostatic pump 20 which is driven by the primary mover 18 of the armored personnel carrier 10. The drive mechanism 64 further includes a fail safe brake 68 which comprises the primary braking mechanism for the armored personnel carrier 10 in that upon actuation thereof, operation of the entire undercarriage 12 is arrested. Finally, the drive mechanism 64 includes a planetary speed reducer 70.

The driving connection between the drive mechanism 64 and the primary transmission 58 of the undercarriage 12 comprises a shaft extending from the planetary speed reducer 70 and having a drive sprocket mounted thereon. The drive sprocket of the output shaft of the planetary speed reducer 70 is in turn drivingly connected to one of the sprockets 60 of the primary transmission 58 by a drive chain.

Referring again to FIG. 5, a secondary axle 72 is supported by each of the secondary frames 26. Each secondary axle 72 is supported for rotation about an axis 74 by a pair of tapered roller bearings 76 and 78. The axis 74 extends parallel to the axis 52 of the primary axle 50. The secondary axle 72 extends to a wheel engaging member 80 having the wheel member 28 mounted thereon.

Each secondary frame 26 encloses a secondary transmission 82 which comprises a driving connection between one of the primary axles 50 and the secondary axle 72 individual thereto. Each secondary transmission comprises a spocket 84 mounted on the primary axle 50, a sprocket 86 mounted on the secondary axle 72 and a drive chain 88 drivingly interconnecting the sprockets 84 and 86. It will thus be understood that upon rotation of the primary axles 50 under the action of the drive mechanism 64 and the primary transmission 58, the secondary transmissions 82 effect rotation of all of the secondary axles 72 and the wheel members 28 carried thereby.

Each secondary frame 26 further includes a disk brake mechanism 90. Upon actuation, the disk brake mechanism arrests rotation of the sprocket 86 of the secondary transmission 82 contained within the particular secondary frame 26 and therefore arrests rotation of the wheel member 28 driven thereby. The disk brake mechanisms 90 of the secondary frames 26 comprise the secondary braking system for the undercarriage 12 in that actuation of all of the disk brakes 90 is necessary in order to fully arrest operation of the driving components of the undercarriage.

Figure 6:
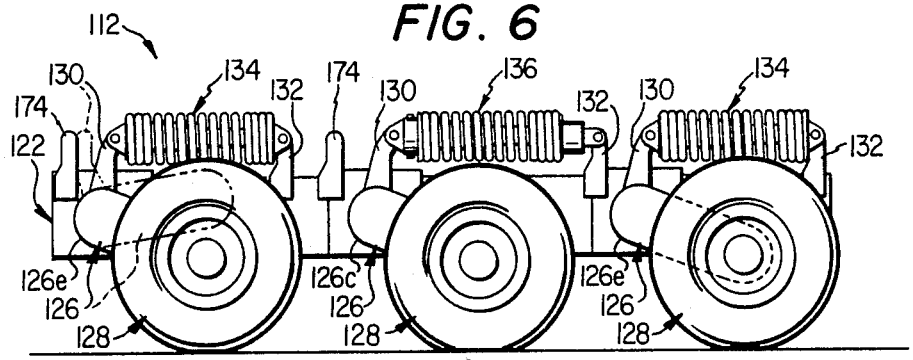
FIG. 6 is a side view of an undercarriage constructed in accordance with a second embodiment of the invention.

Referring now to FIG. 6, there is shown an undercarriage 112 incorporating a second embodiment of the invention. The undercarriage 112 comprises an elongate hollow load bearing primary frame 122. The primary frame 122 has a uniform cross sectional configuration throughout its length. This is an important feature of the invention in that it permits the primary frame 122 to be connected to a superstructure at any point along its entire periphery without necessitating either redesign of the superstructure or providing special attachment portions of the primary frame 122 to permit attachment of the superstructure thereto.

A plurality of secondary frames 126 are supported on the primary frame 122 for pivotal movement with respect thereto. Each of the secondary frames 126 in turn rotatably supports a wheel member 128 at the distal end thereof. The wheel members 128 preferably comprise elastomeric tires, although other types of wheels and/or tires may be utilized in the practice of the invention, if desired.

In accordance with the embodiment of the invention illustrated in FIGS. 6-11, the undercarriage 112 comprises three secondary frames 126 and three wheel members 128 carried thereby. It will be understood that the precise number of secondary frames and wheel members which are utilized in a particular undercarriage is not critical to the practice of the invention. In those instances in which three secondary frames 126 are utilized, there is provided two endmost secondary frames 126e and one center secondary frame 126c.

Each of the secondary frames 126 has an upwardly extending arm 130 secured thereto. The primary frame 122 has a plurality of arms 132 extending upwardly therefrom. The arms 132 are positioned substantially in alignment with the arms 130. In the case of the two endmost secondary frames 126e, a spring/shock absorber assembly 134 is connected between the corresponding arms 130 and 132. In the case of the center secondary frame 126c, a spring/shock absorber/cylinder assembly 136 is connected between the corresponding arms 130 and 132.

Figure 7:
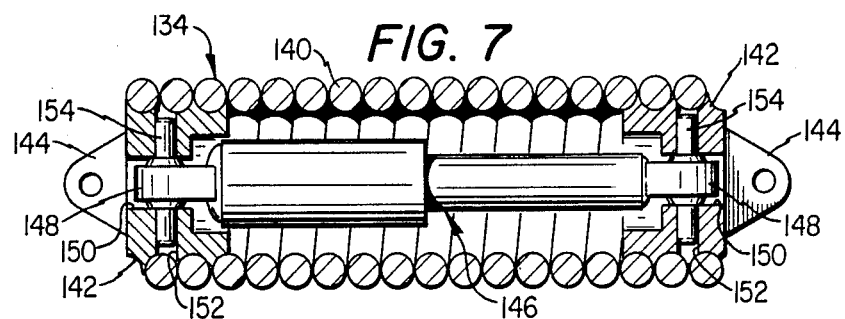
FIG. 7 is an enlarged sectional view illustrating the spring/shock absorber assemblies of the undercarriage of FIG. 6.

The construction of the spring/shock absorber assemblies 134 of the endmost secondary frames 126e is illustrated in FIG. 7. A coil spring 140 has a pair of end blocks 142 threadedly engaged with the end portions thereof. The end blocks 142 are thus retained in engagement with the spring 140 while permitting full extension and retraction of the unattached center portion of the spring. Each end block 142 has a clevis 144 extending therefrom for connection to one of the arms 130 or 132.

A conventional shock absorber 146 of the automotive type is positioned within the spring 140. The shock absorber 146 has conventional connecting portions 148 extending from the opposite ends thereof. The end blocks 142 have longitudinally extending passageways 150 formed therein for receiving the connecting portions 148 of the shock absorber 146. The end blocks 142 also have transversely extending passageways 152 formed therethrough. The passageways 152 receive pins 154 which also extend through the connecting portions 148 of the shock absorber 146. In this manner the shock absorber 146 is retained in engagement with the end blocks 142 of the spring/shock absorber assembly 134.

Figure 8:
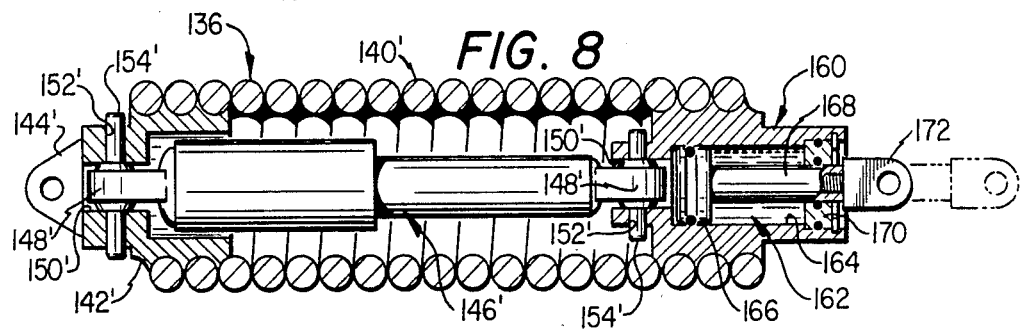
FIG. 8 is a view similar to FIG. 7 illustrating a spring/shock absorber/cylinder assembly.

The construction of the spring/shock absorber/cylinder assembly 136 is illustrated in FIG. 8. The spring/shock absorber/cylinder assembly 136 utilizes numerous component parts which are substantially identical in construction and function to component parts of the spring/shock absorber assembly 134 illustrated in FIG. 7 and described hereinabove in connection therewith. Such identical component parts are designed in FIG. 8 with the same reference numerals utilized in the description of the spring/shock absorber assembly 134, but are differentiated therefrom by means of a prime (') designation.

The primary distinction between the spring/shock absorber assembly 134 of FIG. 7 and the spring/shock absorber/cylinder assembly 136 of FIG. 8 involves the fact that the assembly 136 includes an end cap 160 comprising a hydraulic cylinder 162. The hydraulic cylinder 162 is of the single acting variety and comprises a bore 164 formed in the end cap 160 and a piston 166 mounted for reciprocation in the bore 164 under the action of hydraulic pressure. A piston rod 168 extends from the piston 166 through a closure 170 which seals the bore 164. A clevis 172 is secured to the piston rod 168 for reciprocation therewith.

Referring again to FIG. 6, pivotal motion of the endmost secondary frames 126e is controlled by the springs 140 and the shock absorbers 146 mounted therein, and pivotal movement of the center secondary frame 126c is controlled by the spring 140' and the shock absorber 146' mounted therein. Upward pivotal movement of the secondary frames 126 is against the action of the springs and is limited by stop arms 174 mounted on the primary frame 122. (The arm 132 connected to the spring/shock absorber/cylinder assembly 136 also serves as a stop arm for the endmost secondary frame 126e adjacent thereto.) Downward pivotal movement of the secondary frames 126 is limited by full collapse of the springs 140 and 140'. In actual practice, the extent of upward pivotal movement of the secondary frames 126 as permitted by the stop arms is approximately 20° and downward pivotal movement of the secondary frames 126 as permitted by the full collapse of the springs is approximately 10°.

Figure 9:
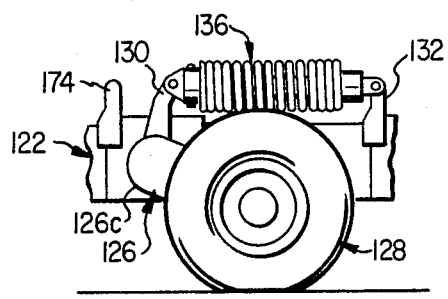
FIGS. 9 and 10 are illustrations of the operation of the spring/shock absorber/cylinder assembly of FIG. 8.
Figure 10:
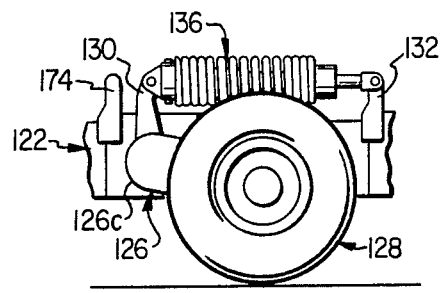

The undercarriage 112 is normally operated with the piston 166 of the spring/shock absorber/cylinder assembly 136 positioned as shown in FIG. 8, that is, with pressurized hydraulic fluid admitted to the bore 164 and the clevis 172 therefore fully retracted. As is best shown in FIGS. 6 and 9, the retracted positioning of the clevis 172 locates the wheel member 128 mounted on the center secondary frame 126c below a plane extending tangent to the wheel members 128 mounted on the endmost secondary frames 126e. It has been found that the positioning of the wheel member 128 mounted on the secondary frame 126e below a plane extending tangent to the wheel members 128 mounted on the secondary frames 126e substantially facilitates skid steering of a vehicle incorporating the undercarriage 112.

Upon release of pressurized hydraulic fluid from the bore 164, the clevis 172 is allowed to extend to the position shown in dashed lines in FIG. 8. When the clevis 172 is so extended the wheel member 128 mounted on the secondary frame 126c is allowed to pivot upwardly to the position shown in FIG. 10. It has been found that the positioning of the wheel member 128 mounted on the secondary frame 126c in alignment with the endmost wheel member 128 facilitates the operation of a vehicle incorporating the undercarriage 112 at high speeds, for example, 30 to 40 m.p.h. or more. In addition, such positioning of the wheel member 128 mounted on the secondary frame 126c substantially stabilizes a vehicle incorporating the undercarriage 112 against fore and aft rocking motion, and is therefore highly advantageous in those instances in which increased stability is necessary or desirable.

The undercarriage 112 illustrated in FIG. 6 is comprising a spring/shock absorber assembly 134 connected to each of the endmost secondary frames 126e and a spring/shock absorber/cylinder assembly 136 connected to the center secondary frame 126c. It will be understood, however, that the undercarriage 112 will function equally well with the spring/shock absorber/cylinder assembly 136 connected to one of the endmost secondary frames 126e, and with the center secondary frame 126c having a spring/shock absorber assembly 134 connected thereto. In such cases the spring/shock absorber/cylinder assembly 136 is normally operated to position the wheel member 128 associated therewith above a plane extending tangent to the center wheel member 128 and to the other endmost wheel member 128. In this manner the undercarriage operates exactly as described above in conjunction with FIG. 6 even though the mounting of the spring/shock absorber/cylinder assembly 136 and one of the spring/shock absorber assemblies 134 is reversed.

In certain applications of the invention it will be advantageous to connect a spring/shock absorber/cylinder assembly between each arm 130 and the arm 132 corresponding thereto. For example, when an undercarriage is so constructed the spring/shock absorber/cylinder assemblies can be actuated to increase ground clearance, thereby allowing a vehicle incorporating the undercarriage to pass over obstacles. The spring/shock absorber/cylinder assemblies can also be used to stabilize and locate the superstructure of a vehicle incorporating the undercarriage in order to effect proper positioning of weapons, surveilance equipment, etc., even though the vehicle is operating on a hillside, etc.

The undercarriage 112 is illustrated in FIG. 6 as comprising three wheels. It will be understood, however, that the undercarriage may comprise four, five, or more wheels in accordance with particular applications of the invention. In the case of a four wheel version the two center wheels are normally positioned below a plane extending tangent to the two endmost wheels, on five wheel versions the three center wheels are normally positioned below a plane extending tangent to the two endmost wheels, etc.

Figure 11:
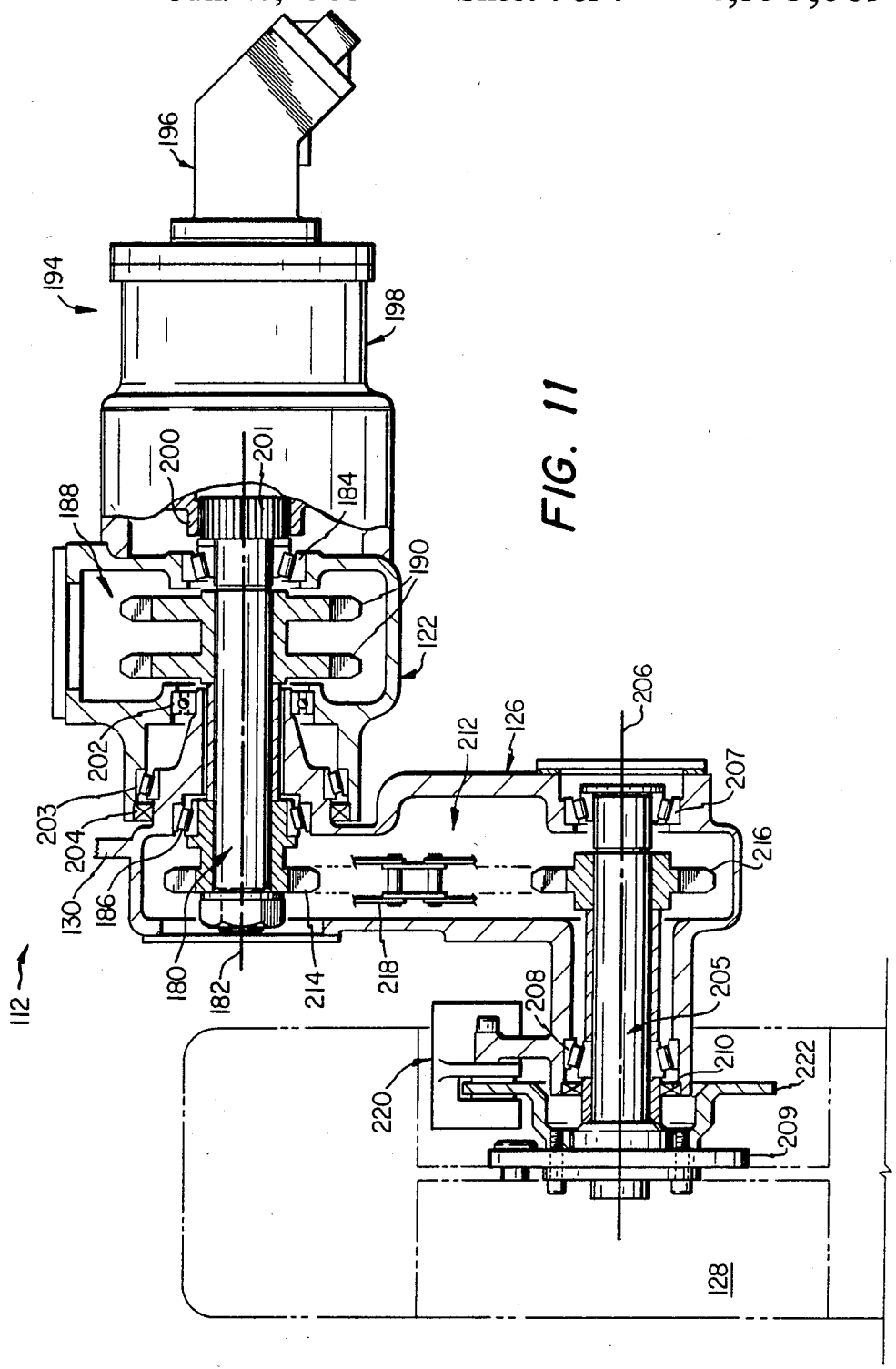
FIG. 11 is an enlarged vertical sectional view of the undercarriage of FIG. 6.

Referring now to FIG. 11, the undercarriage 112 comprising the second embodiment of the invention is illustrated in greater detail. A plurality of primary axles 180 are positioned at longitudinally spaced points along the primary frame 122. Each primary axle is supported for rotation about an axis 182 by a tapered roller bearing 184 mounted in the primary frame 122 and a tapered roller bearing 186 mounted in the secondary frame 126 individual to the particular axle 180. A primary transmission 188 extends through the primary frame 122 and drivingly interconnects the primary axles 180. The primary transmission 188 comprises a plurality of drive sprockets 190. Each primary axle 180 has at least one drive sprocket 190 mounted thereon. The drive sprockets 190 are drivingly interconnected by a plurality of drive chains. Other types of transmissions may be used to drivingly interconnect the primary axles, if desired.

The undercarriage 112 further comprises a drive mechanism 194. The drive mechanism 194 is mounted on the primary frame 122 and is operatively connected to the primary transmission 188 for cooperation therewith to effect rotation of all of the primary axles 180. The drive mechanism 194 includes a hydrostatic motor 196 which is driven by pressurized hydraulic fluid received from a hydrostatic pump which is in turn driven by a prime mover mounted on a superstructure supported on the undercarriage 112. The drive mechanism 194 further includes a planetary speed reducer 198. The output of the planetary speed reducer 198 comprises an internal spline 200 which receives an external spline 201 mounted on one of the primary axles 180. The remaining primary axles 180 have an end cap in lieu of the external spline 201. It will be understood that although a hydrostatic drive is illustrated and described in conjunction with the undercarriage 112, the invention is not limited to such drive systems, and may instead incorporate hydraulic, electrical, pneumatic, and/or mechanical drive systems with equal facility.

The secondary frame 126 is pivotally supported on the primary frame 122 by a ball bearing 202 and a tapered roller bearing 203. A seal 204 is used to prevent entry of foreign matter.

A secondary axle 205 is supported by each of the secondary frames 126. Each secondary axle 205 is supported for rotation about an axis 206 by a pair of tapered roller bearings 207 and 208. The axis 206 extends parallel to the axis 182 of the primary axle 180. The secondary axle 205 extends to a wheel engaging member 209 having the wheel member 128 mounted thereon. A seal 210 is employed to prevent the entry of foreign matter.

Each secondary frame 126 encloses a secondary transmission 212 which comprises a driving connection between one of the primary axles 180 and the secondary axle 205 individual thereto. Each secondary transmission comprises a sprocket 214 mounted on the primary axle 180, a sprocket 216 mounted on the secondary axle 205 and a drive chain 218 drivingly interconnecting the sprockets 214 and 216. It will thus be understood that upon rotation of the primary axles 180 under the action of the drive mechanism 194 and the primary transmission 188, the secondary transmissions 212 effect rotation of all of the secondary axles 205 and the wheel members 128 carried thereby.

Each secondary frame further includes a disk brake mechanism 220. Upon actuation, the disk brake mechanism arrests rotation of a plate 222 carried by the wheel engaging member 209 for rotation therewith. The disk brake mechanisms 220 comprising the undercarriage 112 are adapted for simultaneous actuation, whereupon rotation of the wheel members 128 comprising the undercarrige 112 is simultaneously arrested.

It will thus be understood that the undercarriage of the present invention provides numerous improvements over the prior art, particularly when utilized in conjunction with military equipment. Thus, by means of the invention the advantages normally associated with a relatively long wheel base vehicle are fully provided. These include increased stability, increased traction and increased occupant comfort. At the same time, the advantages with respect to reduced skid steering effort that are normally associated with a short wheel base vehicle are fully realized.

Military equipment incorporating undercarriages of the present invention is adapted for deployment over long distances at high speeds. Because of the extremely smooth ride that is afforded by equipment incorporating the invention, such high speed operation involves minimum occupant discomfort. Upon arrival at the point of conflict such equipment is adapted for operation over various types of adverse terrain, including barricades, rubble resulting from burned or bombed out buildings, bomb craters and the like without undue discomfort to occupants thereof. One particular advantage derived from the use of the invention relates to the pivotally supported secondary frames, whereby the wheels are adapted to "step" over small obstacles and trenches with virtually no discomfort to occupants of the equipment. Another advantage involves that fact that equipment incorporating the invention typically has superior flotation when compared with conventional equipment.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

We claim:
1. An undercarriage comprising:
an elongate hollow load bearing primary frame;
at least three secondary frames;
means supporting the secondary frames at longitudinally spaced points on the primary frame for pivotal movement with respect thereto;
at least three primary axles each having a first portion positioned within the primary frame and a second portion positioned within one of the secondary frames;
means supporting each of the primary axles for rotation both with respect to the primary frame and with respect to its associated secondary frame;

primary transmission means positioned within the primary frame for drivingly interconnecting at least two of the primary axles;

drive means operably connected to the primary transmission means for actuation thereof whereby the drive means and the primary transmission means effect concurrent rotation of the interconnected primary axles;

a plurality of secondary axles each individual to one of the secondary frames and each having a wheel receiving member at one end thereof;

at least three wheel members each mounted on and secured to the wheel receiving end of one of the secondary axles;

means rotatably supporting the secondary axles in the secondary frames with each of the secondary axles extending out of its secondary frame and being rotatably supported in at least one side of its secondary frame;

at least two secondary transmission means each mounted in one of the secondary frames and each drivingly interconnecting one of the primary axles and its associated secondary axle;

one or more first arms mounted on and extending from one or more of the secondary frames adjacent the pivotal axis thereof;

one or more second arms corresponding to each of the first arms mounted on and extending from the primary frame at a predetermined distance from the corresponding first arm;

one or more spring/shock absorber assemblies each mounted substantially horizontally between corresponding first and second arms for controlling and limiting pivotal movement of the secondary frames relative to the primary frame, such that the spring/shock absorber assemblies are placed in tension as the associated wheel members are displaced toward the primary frame; and at least one of the spring/shock absorber assemblies mounted on the center-most secondary frame including a cylinder assembly allowing variation of the overall length of the spring/shock absorber assembly for controlling and limiting pivotal movement of the secondary frame relative to the primary frame, for normally positioning the wheel member on the secondary frame relative to the wheel members mounted on the other secondary frames to facilitate skid steering, and for selectively positioning the wheel member mounted on the secondary frame to facilitate high speed operation.

2. The undercarriage according to claim 1 wherein the primary transmission means comprises sprockets mounted on at least two of the primary axles and a drive chain drivingly interconnecting the sprockets.

3. The undercarriage according to claim 1 wherein the drive means comprises a hydrostatic drive motor and speed reducing means.

4. The undercarriage according to claim 1 wherein each of the secondary frames extends angularly downwardly from the primary frame towards the underlying surface.

5. The undercarriage according to claim 1 wherein each of the secondary transmission means comprises a sprocket mounted on one of the primary axles, a sprocket mounted on the associated secondary axle and a drive chain drivingly interconnecting the sprockets on the primary and secondary axles.

6. The undercarriage according to claim 1 further characterized by stop means mounted on the primary frame for limiting pivotal movement of each secondary frame with respect thereto.

7. The undercarriage according to claim 1 wherein each of the secondary frames includes brake means for selective actuation to arrest the movement of the wheel member carried by the secondary axle of the secondary frame.

8. The undercarriage according to claim 1 wherein each of the secondary frames is hollow and entirely closes its associated secondary transmission means, wherein all of the secondary frames are positioned on the same side of the primary frame, wherein each of the secondary frames extends angularly downwardly from the primary frame toward the underlying surface, wherein each of the secondary transmission means comprises a sprocket mounted on one of the primary axles, a sprocket mounted on the associated secondary axle, and a drive chain drivingly interconnecting the two sprockets, and wherein each of the secondary frames includes brake means for selectively arresting rotation of the wheel member mounted on the associated secondary axle.

9. In an undercarriage of the type including an elongate hollow load bearing primary frame a plurality of primary axles positioned at axially spaced points along the primary frame, means mounted on the primary frame for supporting the primary axles for rotation with respect thereto, transmission means mounted within the primary frame for drivingly interconnecting at least two of the primary axles, and drive means mounted on the primary frame and drivingly connected to the transmission means for cooperation therewith to drive the interconnected primary axles, the improvement comprising:

a plurality of secondary frames each individual to one of the primary axles;

means supporting each of the secondary frames for pivotal movement relative to the primary frame about an axis which is coincident with the axis of rotation of its associated primary axle;

a plurality of secondary axles each individual to one of the primary axles;

means mounted on the secondary frames for supporting the secondary axles for rotation about axes extending parallel to the axes of rotation of the primary axles;

secondary transmission means mounted within the secondary axles for drivingly interconnecting each primary axle and the secondary axles individual thereto;

one or more first arms mounted on and extending from one or more of the secondary frames adjacent the pivotal axis thereof;

one or more second arms corresponding to each of the first arms mounted on and extending from the primary frame at a predetermined distance from the corresponding first arm;

one or more spring/shock absorber assemblies each mounted in parallel and substantially horizontally between corresponding first and second arms for controlling the pivotal movement of the secondary frame relative to the primary frame, such that the spring/shock absorber assemblies are placed in tension as the associated wheel members are displaced toward the primary frame; and cylinder means mounted in series with the spring/shock absorber assemblies allowing selective variation of the overall length of the spring/shock absorber assembly for normally positioning the axles of the secondary frames to facilitate skid steering of the undercarriage and for selectively positioning the axles of the secondary frames to facilitate high speed operation of the undercarriage.

10. The improvement according to claim 9 wherein each secondary transmission means comprises a sprocket mounted on one of the primary axles, a sprocket mounted on the corresponding secondary axle and a drive chain drivingly interconnecting the two sprockets.

11. The improvement according to claim 9 wherein each of the secondary frames further includes brake means for selective actuation to arrest the rotation of the secondary axle carried by the secondary frame.

12. The improvement according to claim 9 further including stop means mounted on the primary frame for limiting the range of movement of the first arms away from the corresponding second arms, thereby limiting pivotal movement of the secondary frame with respect to the primary frame.

13. The improvement according to claim 9 wherein the springs urge the secondary frames to pivot away from the primary frame.

14. The improvement according to claim 9 wherein the spring/shock absorber assemblies connected to each secondary frame includes connecting means for connecting both the spring and the shock absorber to the first arm and to the second arm.

15. The improvement according to claim 14 wherein the positioning means comprises a hydraulic cylinder connected between the primary frame and the spring and the shock absorber connected to the center secondary frame.

16. An an undercarriage comprising:
an elongate hollow load bearing primary frame;
a plurality of elongate hollow secondary frames;
means supporting the secondary frames at longitudinally spaced points along the primary frame for pivotal movement with respect thereto with the secondary frames normally extending angularly downwardly from the primary frame and substantially parallel to one another;
a plurality of primary axles each individual to one of the secondary frames;
means supporting the primary axles for rotation about axes coincident with the axes of pivotal movement of the secondary frames;
transmission means mounted in the primary frame for drivingly interconnecting all of the primary axles;
drive means mounted on the primary frame and connected to the transmission means for cooperation therewith to drive all of the primary axles;
a plurality of secondary axles each individual to one of the secondary frames;
means for supporting each of the secondary axles on its secondary frame for rotation about an axis extending parallel to the axis of rotation of the primary axle individual thereto;
a plurality of secondary transmission means each for drivingly interconnecting one of the primary axles and the secondary axle individual thereto and each including a sprocket mounted on the primary axle within the secondary frame, a sprocket mounted on the secondary axle within the secondary frame and a drive chain enclosed within the secondary frame for drivingly interconnecting the two sprockets;
each of the secondary frames having a lever arm mounted thereon and extending therefrom at a location adjacent the pivotal axis thereof;
a plurality of lever arms mounted on the primary frame in alignment with the lever arms on the secondary frames;
a plurality of springs each connected between the lever arm on one of the secondary frames and a corresponding lever arm on the primary frame;
a plurality of shock absorbers each connected between the lever arm on one of the secondary frames and the corresponding lever arm on the primary frame;
hydraulic cylinder means connected at one end to one of the springs and to one of the shock absorbers and connected at the other end to one of the lever arms for normally positioning the secondary axles of one of the secondary frames substantially out of alignment with a plane extending tangent to at least two other secondary axles and thereby facilitating skid steering and for selective actuation to align all of the secondary axles and thereby facilitating high speed operation; and
the springs, shock absorbers and cylinder means being mounted substantially horizontally between their associated lever arms, such that the springs are placed in tension as the associated wheel members are displaced toward the primary frame.

17. The undercarriage according to claim 16 further including a wheel carried by each of the secondary axles and supported thereby adjacent the secondary frame which rotatably supports the secondary axis.

18. For use in an undercarriage of the type having secondary frames pivotally supported on a primary frame, a spring/shock absorber assembly comprising:
a coil spring;
a shock absorber positioned within the coil spring;
a first end member threadedly engaged with one end of the coil spring and having one end of the shock absorber connected thereto;
a second end member threadedly engaged with the opposite end of coil spring and having the opposite end of the shock absorber connected thereto; and
means on the end members for connecting the spring/shock absorber assembly to one of the secondary frames and to the primary frame of the undercarriage.

19. The spring/shock absorber assembly according to claim 18 wherein one of the end members has hydraulic cylinder means mounted therein for selectively extending and retracting the correcting means of the end member relative to the spring and the shock absorber.

20. The spring/shock absorber assembly according to claim 19 wherein the shock absorber has connecting members extending from the opposite ends thereof, and further including pins extending through the end members and the connecting members of the shock absorber to the end members.

* * * * *